United States Patent
Tang

(10) Patent No.: US 10,423,139 B2
(45) Date of Patent: Sep. 24, 2019

(54) DEVICE CONTROL METHOD AND APPARATUS, AND DEVICE CONTROL SYSTEM

(71) Applicants: BOE TECHNOLOGY GROUP CO., LTD., Beijing (CN); K-TRONICS (SUZHOU) TECHNOLOGY CO., LTD., Suzhou, Jiangsu (CN)

(72) Inventor: Jinchao Tang, Beijing (CN)

(73) Assignees: BOE TECHNOLOGY GROUP CO., LTD., Beijing (CN); K-TRONICS (SUZHOU) TECHNOLOGY CO., LTD., Suzhou, Jiangsu (CN)

(*) Notice: Subject to any disclaimer, the term of this patent is extended or adjusted under 35 U.S.C. 154(b) by 20 days.

(21) Appl. No.: 15/556,223

(22) PCT Filed: Mar. 3, 2017

(86) PCT No.: PCT/CN2017/075597
§ 371 (c)(1),
(2) Date: Sep. 6, 2017

(87) PCT Pub. No.: WO2017/193678
PCT Pub. Date: Nov. 16, 2017

(65) Prior Publication Data
US 2018/0113426 A1    Apr. 26, 2018

(30) Foreign Application Priority Data
May 9, 2016  (CN) .......................... 2016 1 0302694

(51) Int. Cl.
*G05B 19/042* (2006.01)
*G06F 3/0482* (2013.01)
(Continued)

(52) U.S. Cl.
CPC ......... *G05B 19/042* (2013.01); *G06F 3/0482* (2013.01); *H04L 67/06* (2013.01);
(Continued)

(58) Field of Classification Search
CPC ........ G05B 19/042; G05B 2219/25022; G05B 2219/2642; H04L 67/26; H04L 67/06; G06F 3/0482; G06F 3/0488
See application file for complete search history.

(56) References Cited

U.S. PATENT DOCUMENTS

2008/0028294 A1    1/2008  Sell et al.
2013/0276009 A1*  10/2013  Ajitomi ................. H04N 21/43
                                                725/14
(Continued)

FOREIGN PATENT DOCUMENTS

CN    101794500 A    8/2010
CN    102065572 A    5/2011
(Continued)

OTHER PUBLICATIONS

The Second Chinese Office Action dated Aug. 17, 2018; Appln. No. 201610302694.3.
(Continued)

*Primary Examiner* — Yasser A Abdelaziez
(74) *Attorney, Agent, or Firm* — Ladas & Parry LLP

(57) ABSTRACT

A device control method and apparatus, a cloud control method and apparatus and a device control system. The device control method includes: receiving a page opening request, the page opening request indicating opening a content page of the device; acquiring a generating template of the content page according to the page opening request; acquiring content data of the content page; generating the content page according to the generating template and the content data; and providing the content page.

18 Claims, 6 Drawing Sheets

(51) Int. Cl.
*H04L 29/08* (2006.01)
*G06F 3/0488* (2013.01)

(52) U.S. Cl.
CPC .... *H04L 67/26* (2013.01); *G05B 2219/25022* (2013.01); *G05B 2219/2613* (2013.01); *G05B 2219/2642* (2013.01); *G06F 3/0488* (2013.01)

(56) References Cited

U.S. PATENT DOCUMENTS

| | | | |
|---|---|---|---|
| 2016/0173953 A1 | 6/2016 | Zhang et al. | |
| 2018/0069947 A1* | 3/2018 | Antipa | H04L 67/327 |
| 2018/0189077 A1* | 7/2018 | Gupta | G06F 9/453 |

FOREIGN PATENT DOCUMENTS

| | | | |
|---|---|---|---|
| CN | 10223826 A | 11/2011 | |
| CN | 102271159 A | 12/2011 | |
| CN | 102811377 A | 12/2012 | |
| CN | 103034504 A | 4/2013 | |
| CN | 103607607 A | 2/2014 | |
| CN | 103634700 A | 3/2014 | |
| CN | 104284250 A | 1/2015 | |
| CN | 104469475 A | 3/2015 | |
| CN | 105472426 A | 4/2016 | |
| CN | 105955111 A | 9/2016 | |
| EP | 2524496 A2 | 11/2012 | |

OTHER PUBLICATIONS

International Search Report and Written Opinion dated Jun. 1, 2017; PCT/CN2017/075597.
The First Chinese Office Action dated Feb. 23, 2018; Appln. No. 201610302694.3.

* cited by examiner

DEVICE CONTROL METHOD AND APPARATUS, AND DEVICE CONTROL SYSTEM

TECHNICAL FIELD

Embodiments of the present disclosure relate to a device control method and apparatus thereof, a cloud control method and apparatus thereof, a device processing method and apparatus, and a device control system.

BACKGROUND

With increasing abundance and popularity of smart devices (for example, smart refrigerators, microwave ovens, televisions, etc.), various environments and conditions are also increasingly intellectualized, and interaction between human and various smart devices attracts more and more attention, resulting in a growing amount of data to be generated and a higher and higher degree of specialization. At present, smart devices vary widely, generality of platforms is poor. Device intellectualization relates to the Internet, control and other fields, and involves a wide range of technical fields, such that technical requirements are relatively high to implement intellectualization.

SUMMARY

At least an embodiment of the disclosure provides a device control method, comprising: receiving a page opening request, the page opening request indicating opening a content page of the device; acquiring a generating template of the content page according to the page opening request; acquiring content data of the content page; generating the content page according to the generating template and the content data; and providing the content page.

At least an embodiment of the disclosure provides a cloud control method, comprising: receiving a template acquiring request from a client; transmitting information of a generating template to the client according to the template acquiring request, wherein the information of the generating template is used for generating at least one of a multimedia list page and a multimedia file page; receiving a push command of a multimedia file from the client, the multimedia file being included in at least one of the multimedia list page and the multimedia file page; and transmitting the push command to a device controlled by the client.

At least an embodiment of the disclosure provides a device control apparatus, comprising: an input module, configured to receive a page opening request, wherein the page opening request indicates opening a content page of the device; a template generating module, configured to acquire a generating template of the content page according to the page opening request; a content page generating module, configured to acquire content data of the content page, and generate the content page according to the generating template and the content data; and a providing module, configured to provide the content page.

At least an embodiment of the disclosure provides a device control system, comprising: the device control apparatus described above; a device processing apparatus; and a cloud control apparatus. The cloud control apparatus is configured to: receive a template acquiring request from the device control apparatus; transmit information of the generating template to the device control apparatus according to the template acquiring request; receive a push command of a multimedia file from the device control apparatus; transmit the push command to the device processing apparatus; receive a control command from the device control apparatus; and transmit the control command to the device processing apparatus. The device processing apparatus is configured to: acquire multimedia data from the multimedia server in response to receiving the push command; and complete an operation specified by the control command in response to receiving the control command.

BRIEF DESCRIPTION OF THE DRAWINGS

In order to illustrate the technical solutions in the embodiments of the present disclosure more clearly, the drawings needed to be used in the description of the embodiments will be briefly described in the following. It is obvious that the drawings described below are only related to some embodiments of the present disclosure, and are not intended to be limitative to the disclosure.

DETAILED DESCRIPTION

Figure 1:
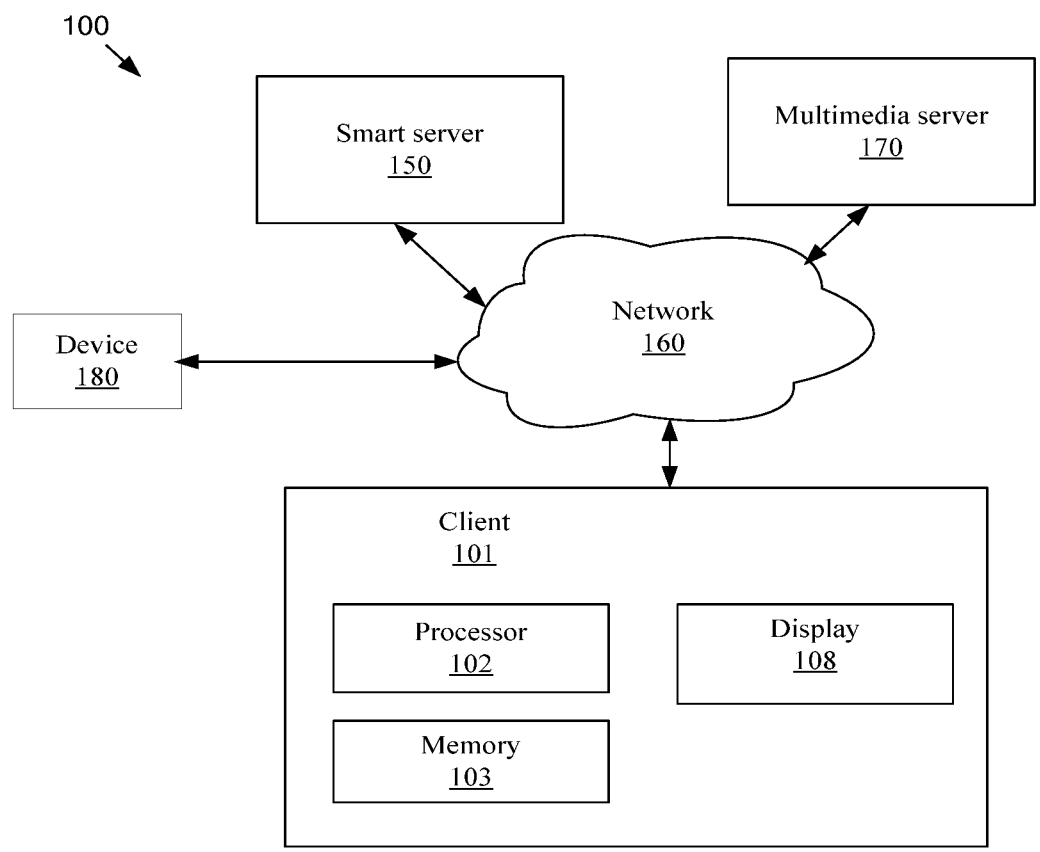
FIG. 1 is a schematic diagram of a device control system provided by an embodiment of the present disclosure.

Hereinafter, the technical solutions of the embodiments of the present disclosure will be described in a clearly and fully understandable way in conjunction with the drawings related to the embodiments of the present disclosure; with reference to non-restrictive exemplary embodiments shown in the drawings and described in detail in the following description, exemplary embodiments of the present disclosure and their various features and favorable details are illustrated more comprehensively. It should be noted that, the features shown in the drawings are not necessarily drawn according to scale. Known materials, components and process technologies are not described in the present disclosure so as not to obscure the exemplary embodiments of the present disclosure. Examples given are merely intended to facilitate understanding of implementation of exemplary embodiments of the present disclosure, and further enable those skilled in the art to implement the exemplary embodiments. Therefore, the examples should not be construed as limiting the scope of the exemplary embodiments of the present disclosure.

Unless otherwise defined, technical terms or scientific terms used in the present disclosure should be of general meaning as understood by those ordinarily skilled in the art. "First", "second" and similar words used in the present disclosure do not represent any sequence, quantity or importance and merely intend to differentiate different composite parts. In addition, in respective embodiments of the present disclosure, same or similar reference signs denote same or similar parts.

Hereinafter, specific implementation modes of a device control method and an apparatus thereof, a cloud control method and an apparatus thereof, a device processing method and an apparatus thereof, and a device control system provided by the embodiments of the present disclosure will be illustrated in detail in conjunction with the drawings.

At present, a multi-screen interaction function between smart devices on the market is basically limited to implementation of screen transmission or interaction within a local area network (LAN), and a smart client (for example, a mobile phone) often needs to constantly switch networks, and cannot implement remote control. For example, a television terminal may implement control through a remote controller; however, remote control on a television through a mobile phone terminal cannot be implemented. For another example, a current screen transmission technology is basically mirroring content played on the mobile phone directly to the television terminal, and so video play simultaneously occupies the mobile phone, the television and a network resource. For another example, all terminals needs to be within a local area network, and mutual transmission through various networks cannot be implemented. A current mobile phone remote control function is simple, which is unable to provide control of a rich content. Moreover, a code sharing part is small, and development is complicated, which is not beneficial for use of a large volume of multi-models. Provision of video content is also limited, and a rich video content cannot be provided.

Embodiments of the present disclosure provide an apparatus, a system and a method for implementing control (e.g., video-on-demand (VOD)) of a smart device by installing a micro-link application (APP) on a client. For example, embodiments of the present disclosure achieve displaying a program list on a client, and directly transmitting video content from a multimedia server to a television terminal for playing, so as to achieve a simple operation and to operate the television more intuitively. The embodiments of the present disclosure may implement connection between a smart device and a smart client, easily implement remote management and interconnection and interaction between smart devices, and between human and the smart devices. The embodiments of the present disclosure may implement control of a smart device by a person, accelerate a development process of the smart device, and reduce difficulty in developing device intellectualization.

For example, a smart client may be a control terminal of a smart device, and a user may complete the control and video-on-demand service of the smart device with the smart client through 3G/4G, WIFI and other networks. The embodiments of the present disclosure, by accessing the smart device (e.g., TV hardware devices) through the micro-link application (app) on the smart client, are used for playing Internet TV content. A multimedia content may be provided by a multimedia server, and the micro-link application on the smart client is used for implementing interactive communication between the user and the hardware and for interactive communication between a micro-link and the multimedia server. A basic communication protocol between a hardware device and the micro-link application may be JoyLink. A control instruction issued by the micro-link application may be provided by the multimedia server. A processing apparatus in the device may be used for implementing interactive instruction between the cloud (e.g., the multimedia server) and the hardware as well as interactive communication for bundling activation between the micro-link application and the smart device. The embodiments of the present disclosure divide servers (or the cloud) into a smart server (a smart service cloud) and a multimedia server (a multimedia service cloud); the smart server implements control of the device (for example, the television), and the multimedia server provides the multimedia content. By using the method, it is able to implement separation of the control from the video supply, and with respect to development of the smart server, it is able to achieve sharing to save development time. Moreover, the system provided by the embodiments of the present disclosure may comprise a plurality of different multimedia servers, and may be compatible with more video content providers, so as to provide the user with more choices.

As shown in FIG. 1, a device control system 100 comprises a client 101, a device 180, a smart server 150, and a multimedia server 170; where the client 101 completes control of the device 180 (e.g., multimedia file push control and other operational control) through the smart server.

The device 180 may be a smart device. For example, the device 180 includes a smart television, a smart refrigerator, a smart air conditioner, a smart microwave oven, or another smart appliance or device. For example, the device 180 is configured to: acquire multimedia data from the multimedia server 170 in response to receiving a push command; and complete an operation specified by a control command in response to receiving the control command. For example, the multimedia server 170 is used for storing a multimedia file list to be pushed and played, information related to multimedia files, and multimedia files.

In some embodiments, the client 101, the smart server 150, the multimedia server 170, and the device 180 are interconnected via a network 160. For example, the network 160 includes, but not limited to, a mobile communication access network (e.g., 4G, 3G), a wide area network or a local area network (e.g., WIFI), and the like. For another example, the network 160 includes the Internet.

For example, the client 101 may be a computing device which includes a processor and a memory. For example, the client 101 may be a smart phone, a game controller, and another terminal (e.g., a mobile terminal) including a processor and a memory. In some embodiments, the client 101 may include a processor 102, a memory 103, a display 108, a browser (not shown), an input device (e.g., a microphone), an output device (e.g., a speaker) and other components.

The processor 102 may process data signals, and may include various computational structures, for example, a complex instruction set computer (CISC) structure, a reduced instruction set computer (RISC) structure, or a structure that implements a variety of instruction set combinations. In some embodiments, the processor 102 may also be a microprocessor.

The memory 103 may store instructions and/or data executed by the processor 102. These instructions and/or data may include code for implementing some functions or all functions of one or more of the modules as described in embodiments of the present disclosure. For example, the memory 103 includes a dynamic random access memory (DRAM), a static random access memory (SRAM), a flash memory, an optical memory, or other memory known to those skilled in the art.

The display 108 may be used for displaying data. For example, the display 108 may be an LCD display, an LED display, or another display. The display 108 may include a display screen having a touch function.

In some embodiments, the smart server 150 and the multimedia server 170 may include components similar to those of the client 101, for example, a display, a processor, and a memory (not shown). Functions of the processor and the memory of the smart server 150 and the multimedia server 170 are similar to those of the processor 102 and the memory 103 of the client 101.

Figure 2:
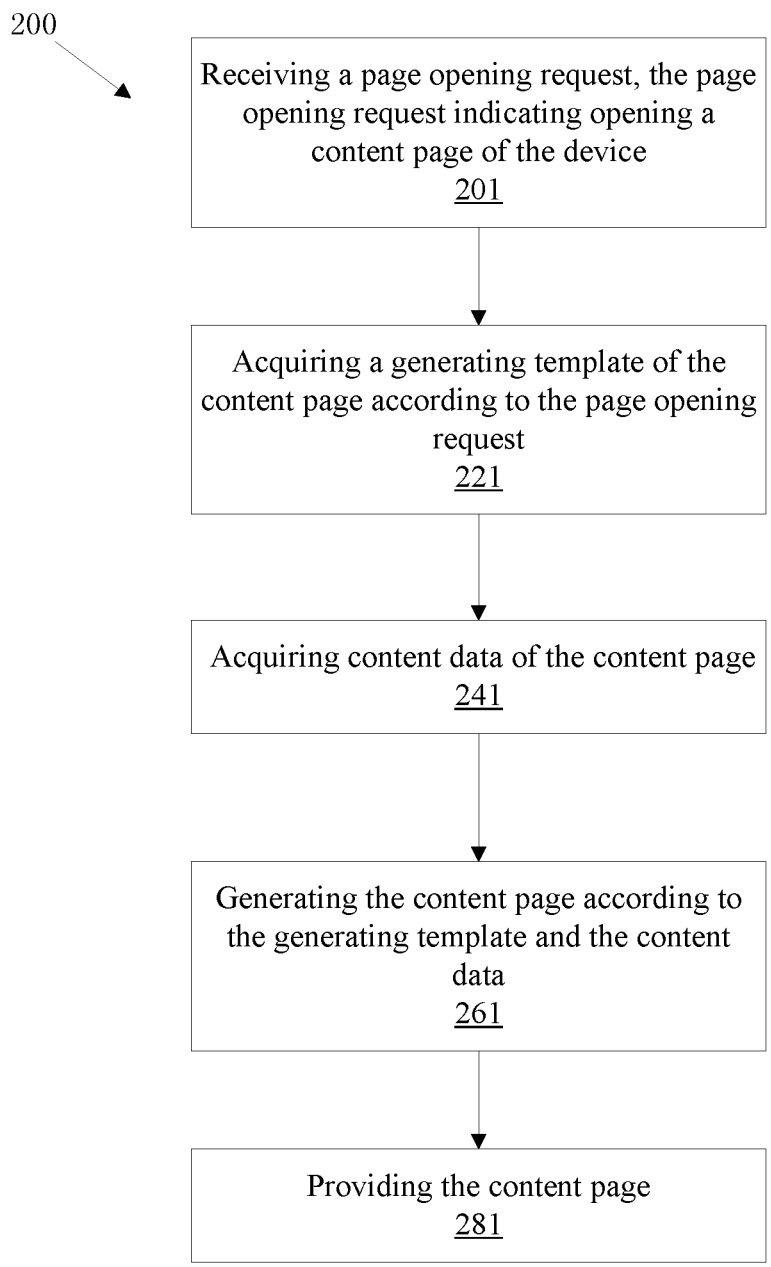
FIG. 2 is a device control method provided by an embodiment of the present disclosure.
Figure 4:
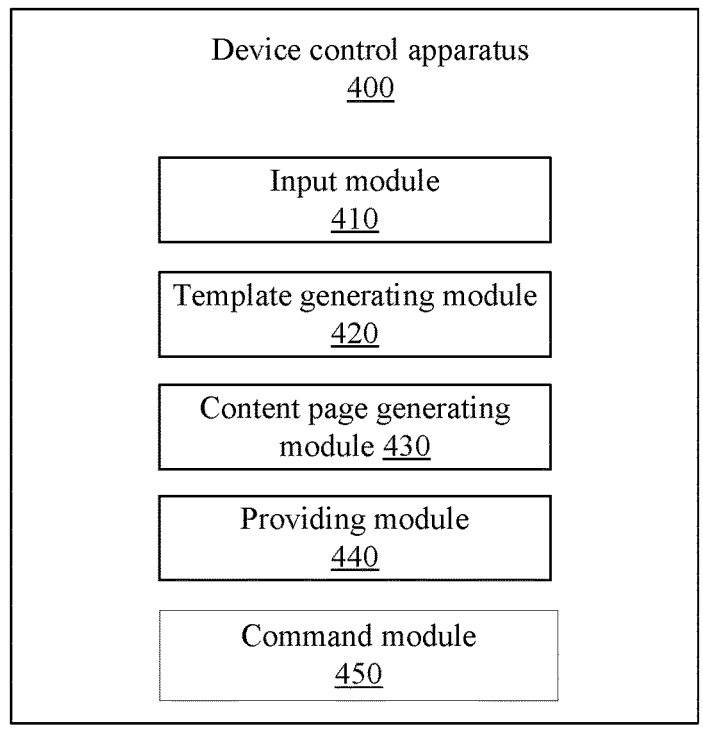
FIG. 4 is a schematic diagram of a device control apparatus provided by an embodiment of the present disclosure.

As shown in FIG. 2, an embodiment of the present disclosure provides a device control method 200. For example, a device control apparatus 400 (as shown in FIG. 4) located on the client 101 may implement control of the device 180 by using the device control method 200. The device control method 200 comprises: step 201, receiving a page opening request, the page opening request indicating opening a content page of the device; step 221, acquiring a generating template of the content page according to the page opening request; step 241, acquiring content data of the content page; step 261, generating the content page according to the generating template and the content data; and step 281, providing the content page.

For example, in step 221, acquiring a generating template of the content page, includes: transmitting a template acquiring request; and receiving information of the generating template.

For example, the content page includes a multimedia list page, and the content data includes multimedia list data. In step 241, acquiring content data of the content page, includes: generating a multimedia list request; transmitting the multimedia list request to the multimedia server; and receiving the multimedia list data from the multimedia server. In step 261, generating the content page according to the generating template and the content data, includes: generating the multimedia list page according to the generating template and the multimedia list data. In step 281, providing the content page, includes: displaying the multimedia list page.

After displaying the multimedia list page, the method 200 may further comprise: receiving first input information, the first input information indicating a selected multimedia file.

For another example, the content page further includes a multimedia file page, and the content data further includes multimedia file data. In step 241, acquiring content data of the content page, further includes: generating a multimedia file request; transmitting the multimedia file request to the multimedia server; and receiving the multimedia file data from the multimedia server. The multimedia file may be a selected multimedia file indicated by the first input information. In step 261, generating the content page according to the generating template and the content data, further includes: generating the multimedia file page according to the generating template and the multimedia file data. In step 281, providing the content page, further includes: displaying the multimedia file page.

After displaying the multimedia list page or after displaying the multimedia file page, the method 200 may further comprise: receiving second input information, the second input information indicating pushing the multimedia file; generating a push command of the multimedia file according to the second input information; and transmitting the push command of the multimedia file to the smart server.

For another example, the content page is a device control page, and the content data is device control data. In step 241, the acquiring content data of the content page, includes: generating a device control request; transmitting the device control request to the smart server; and receiving the device control data from the smart server, where the device control data includes a current state of the device and control instruction data of the device. In step 261, the generating the content page according to the generating template and the content data, further includes: generating the device control page according to the generating template and the device control data. In step 281, the providing the content page, includes: displaying the device control page.

After displaying the device control page, the method 200 further comprises: receiving third input information, the third input information indicating control information of the device; generating a control command of the device according to the third input information; and transmitting the control command of the device to the smart server.

An example of the device control method 200 will be described in detail below with reference to FIG. 7.

Figure 3:
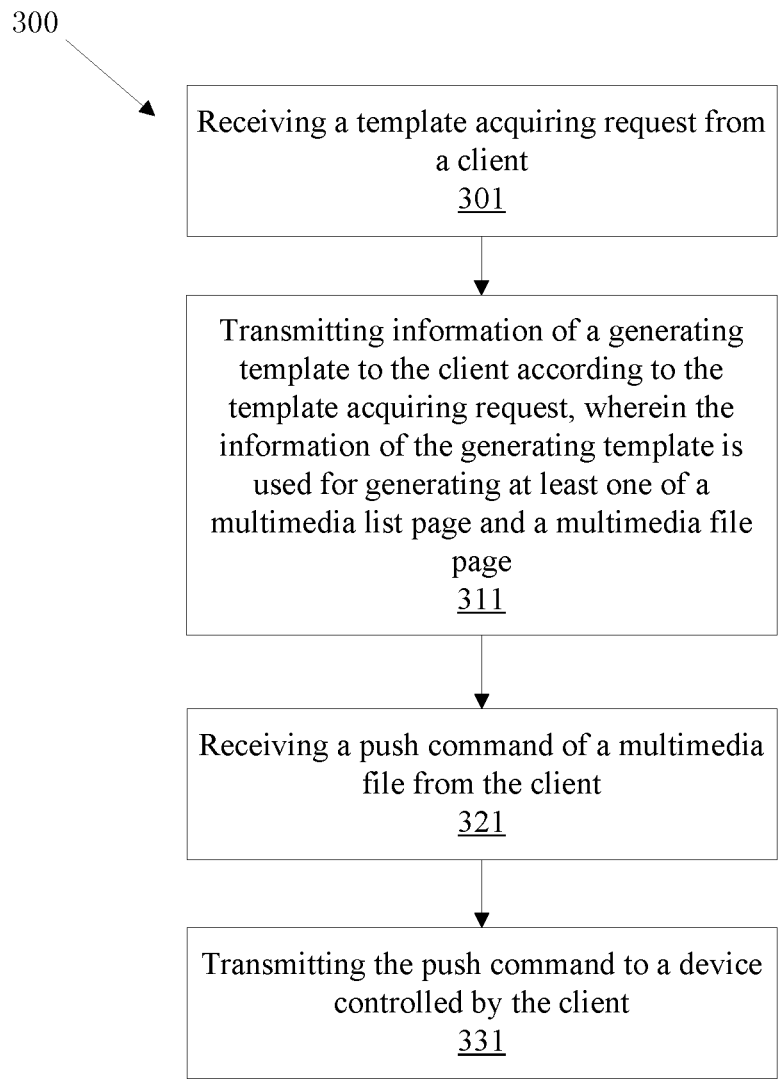
FIG. 3 is a cloud control method provided by an embodiment of the present disclosure.
Figure 5:
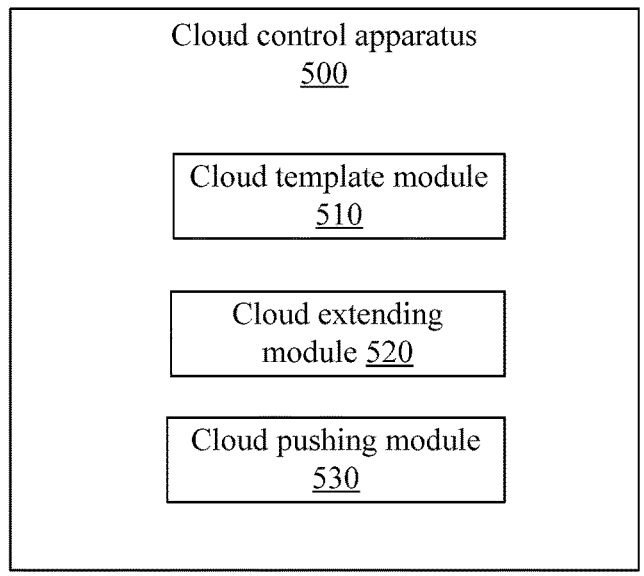
FIG. 5 is a schematic diagram of a cloud control apparatus provided by an embodiment of the present disclosure.

As shown in FIG. 3, an embodiment of the present disclosure provides a cloud control method 300. The cloud control method 300, which is implemented by a cloud control apparatus 500 (as shown in FIG. 5) located in a smart server 150, comprises: step 301, receiving a template acquiring request from a client 101; step 311, transmitting information of a generating template to the client 101 according to the template acquiring request, where the information of the generating template is used for generating at least one of a multimedia list page and a multimedia file page; step 321, receiving a push command (e.g., a play command) of a multimedia file from the client 101; and step 331, transmitting the push command to a device 180 controlled by the client 101.

In some embodiments, the cloud control method 300 further comprises: receiving a control command of the device from the client 101; and transmitting the control command to the device 180. For example, the smart server 150 (or, the cloud control apparatus 500 located in the smart server 150) receives a volume-up control command from the client 101, the smart server 150 forwards the volume-up control command to the device 180, and the device 180 interprets and executes the volume-up control command. For example, the control command from the client 101 includes, but is not limited to, one or more of the following: open, close, previous, next, previous page, next page, upward, downward, confirm, volume-up, volume-down, play, pause, stop, and so on. For example, the control commands may be pre-stored in a memory of the smart server 180.

In some embodiments, the cloud control method 300 further comprises: receiving extended information of the multimedia server 170 from the multimedia server 170; and transmitting the extended information to the device 180. For example, when authentication information is needed to access the multimedia files of the multimedia server 170, the multimedia server 170 transmits the authentication information as the extended information to the smart server 150, and the smart server 150 transmits the extended information to the device 180 (for example, the device 180 acquires a pushed multimedia file through the authentication information, and plays the multimedia file). As shown in FIG. 4, an embodiment of the present disclosure provides a device control apparatus 400. For example, the device control apparatus 400 may be a micro-link application which is primarily implemented with software. The device control apparatus 400 comprises: an input module 410, a template generating module 420, a content page generating module 430, a providing module 440, and a command module 450. For example, the input module 410 is configured to receive a page opening request, where the page opening request indicates opening a content page of the device; the template generating module 420 is configured to acquire a generating template of the content page according to the page opening request; the content page generating module 430 is configured to acquire content data of the content page and generate the content page according to the generating template and the content data; and the providing module 440 is configured to provide the content page.

In some embodiments, the input module 410, the template generating module 420, the content page generating module 430, the command module 450, and the providing module 440 may be stored in the memory 103 of the client 101. For example, the input module 410, the template generating module 420, the content page generating module 430, the command module 450, and the providing module 440 may include code and programs stored in the memory 103 (or other memory of the client 101); and the processor 102 may execute the code and programs, so as to implement some or all of the functions as described in the embodiments of the present disclosure.

In some embodiments, the template generating module 420 is configured to: transmit a template acquiring request; and receive information of the generating template. For example, the template generating module 420 transmits a template acquiring request to the smart server 150, and the smart server 150 returns the information of the generating template to the template generating module 420. For example, the generating template may be developed by using an html5 protocol.

In some embodiments, the content page is a multimedia list page, and the content data is multimedia list data. The content page generating module 430 is configured to: generate a multimedia list request; transmit the multimedia list request to the multimedia server 170; receive the multimedia list data from the multimedia server 170; and generate the multimedia list page according to the generating template and the multimedia list data. The providing module 440 is configured to display the multimedia list page. The input module 410 is further configured to receive first input information, the first input information indicating a selected multimedia file. For example, a touch screen displays the multimedia file list, and a user clicks on the touch screen to select a multimedia file from the multimedia list page; the touch screen generates the first input information according to the user's click, and transmits the first input information to the input module 410. The first input information is used for identifying the multimedia file selected by the user.

In some embodiments, the content page is a multimedia file page, and the content data is multimedia file data. The content generating module 430 is further configured to: generate a multimedia file request; transmit the multimedia file request to the multimedia server; receive the multimedia file data from the multimedia server; and generate the multimedia file page according to the generating template and the multimedia file data. The providing module 440 is configured to display the multimedia file page. The input module 410 is further configured to: receive second input information, the second input information indicating pushing the multimedia file. For example, the touch screen displays the multimedia file, and the user clicks the touch screen to play the multimedia file; the touch screen generates the second input information according to the user's click, and transmits the second input information to the input module 410. The second input information indicates that the user clicks to play the multimedia file. The command module 450 is configured to: generate a push command of the multimedia file according to the second input information; and transmit the push command of the multimedia file to the smart server 150.

In some embodiments, the content page is a device control page, and the content data is device control data. The content generating module 430 is configured to: generate a device control request; transmit the device control request to the smart server; receive the device control data from the smart server, where the device control data includes a current state of the device and control instruction data of the device; and generate the device control page according to the generating template and the device control data. The providing module 440 is configured to: display the device control page. The input module 410 is configured to: receive third input information, the third input information indicating control information of the device. The command module 450 is configured to: generate a control command of the device according to the third input information; and transmit the control command of the device to the smart server 150. For example, the device 180 is a smart television, and the device control page generated by the content page generating module 430 is a remote controller interface. A touch screen of the client 101 displays the remote controller interface, and the user implements remote control of the device 180 by clicking on different soft keys on the remote controller interface; the touch screen generates the third input information according to the user's click, and transmits the third input information to the input module 410. For example, the third input information indicates that the user pauses playing of the multimedia file that is currently being played.

As shown in FIG. 5, an embodiment of the present disclosure provides a cloud control apparatus 500. The cloud control apparatus 500 comprises: a cloud template module 510 and a cloud pushing module 530. The cloud template module 510 is configured to: receive a template acquiring request from the device control apparatus 400; and transmit information of the generating template to the device control apparatus 400 according to the template acquiring request. The cloud pushing module 530 is configured to: receive a push command of a multimedia file from the device control apparatus 400; and transmit the push command to a device processing apparatus 600. The cloud pushing module 530 is further configured to: receive a control command from the device control apparatus 400; and transmit the control command to the device processing apparatus 600 (as shown in FIG. 6).

In some embodiments, the cloud control apparatus 500 further comprises a cloud extending module 520. The cloud extending module 520 is configured to receive extended information of the multimedia server 170 and transmit the received extended information to the device 180.

Figure 6:
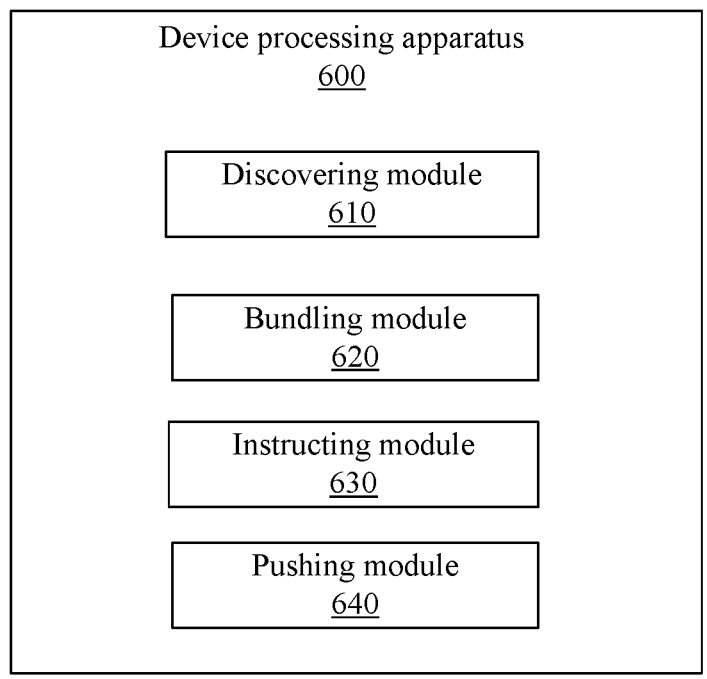
FIG. 6 is a schematic diagram of a device processing apparatus provided by an embodiment of the present disclosure.

As shown in FIG. 6, an embodiment of the present disclosure provides a device processing apparatus 600. For example, the device processing apparatus 600 is used for assisting the device control apparatus 400 to complete a control operation. The device processing apparatus 600 comprises: a discovering module 610, a bundling module 620, an instructing module 630, and a pushing module 640. The discovering module 610 is configured to discover a device 180 according to one or more parameters; the bundling module 620 is configured to bundle the discovered device 180 with a smart server 150, the bundling module 620 may establish a persistent link between the bundled device 180 and the smart server 150; the instructing module 630 is configured to receive a control command from the cloud control apparatus 500 (the control command is firstly generated by the device control apparatus 400, and then transmitted to the cloud control apparatus 500) and interpret the control command, and the instructing module 630 transmits the interpreted command to the device 180 for execution; the pushing module 640 is configured to receive a push command from the cloud control apparatus 500 (the push command is firstly generated by the device control apparatus 400, and then transmitted to the cloud control apparatus 500), and the pushing module 640 transmits a multimedia play request to the multimedia server 180 according to the push command. The multimedia server 180 transmits multimedia data directly to the device 180 to play in response to the multimedia play request.

In some embodiments, the discovering module 610, the bundling module 620, the instructing module 630, and the pushing module 640 may be stored in a memory of the device 180. For example, the discovering module 610, the bundling module 620, the instructing module 630, and the pushing module 640 may include code and programs stored in the memory (or other memory of the device 180); and the processor may execute the code and programs, so as to implement some or all of the functions as described in the embodiments of the present disclosure.

In some embodiments, parameters according to which the discovering module 610 discovers the device include, but are not limited to, one or more of the following: (1) PRODUCT_UUID, a unique identifier of a product type; (2) PRODUCT_SECRET, a product secret key generated when a device manufacturer registers the product in a back platform of a developer; and (3) DEVICE_ID, a device identifier generated when the device manufacturer registers the product on a website. For example, the above-described three parameters may be stored in a non-erasable portion of a ROM layer.

In some embodiments, the bundling module 620 establishes the persistent link with the smart server 150 according to a feedback number FEED_ID, where the feedback number FEED_ID is a parameter returned by the smart server 150 to the device 180 after the bundling is successful. For example, the feedback number FEED_ID is an identification number generated by the smart server 150 for identifying the device 180.

In some embodiments, control commands interpreted by the instructing module 630 include, but are not limited to, one or more of the following: open, close, upward, downward, volume-up or volume-down, return, leftward, rightward, return to home page, menu, confirm, and so on. For example, a user firstly selects a volume-up control command on a device control page displayed by the device control apparatus 400 located on the client 101, then the device control apparatus 400 transmits the control command to the smart server 150, the smart server 150 transmits the received control command to the device processing apparatus 600 located on the device 180 by using the persistent link established with the device 180. Thereafter, the device processing apparatus 600 interprets the received control command and transmits the interpreted command to an executing part of the device 180, and the interpreted command is executed by the executing part of the device 180, that is, turning up the volume of an audio/video file currently being played by the device 180.

In some embodiments, the pushing module 640 receives a push command from the smart server 150, and the push command includes address information of the multimedia file on demand. The pushing module 640 converts the received push command into a multimedia data request instruction, and transmits the multimedia data request instruction to the multimedia server 170. The multimedia server 170 pushes the multimedia file directly to the device 180 for playing according to the multimedia data request instruction.

The device processing apparatus 600 is primarily used for application program development, and assisting the device 180 to quickly access the device control apparatus 400 of the client 101 (e.g., the device control apparatus 400 is a micro-link application). For example, the device processing apparatus 600 implements interaction between the device 180 and the device control apparatus 400 of the client 101 via a local area network or a remote cloud and according to a Joylink protocol. For example, functions of the interaction between the device 180 and the device control apparatus 400 of the client 101 include: discovering the device, completing a write operation of the parameters, acquiring a snapshot of the device 180, and controlling the device 180, and so on. For example, a developing process of the device processing apparatus 600 includes: firstly, developing and debugging on a computer terminal, for example, debugging and approving a protocol within the cloud and the local area network based on an ubuntu operating system; and secondly, transplanting code debugged and approved into the device 180. For example, code implemented by software of the device processing apparatus 600 is debugged and approved in an ubuntu-14-10 environment.

An embodiment of the present disclosure further provides a device control system, comprising: the device control apparatus, the device processing apparatus, and the cloud control apparatus as described above. For example, the cloud control apparatus is configured to: receive a template acquiring request from the device control apparatus; transmit information of the generating template to the device control apparatus according to the template acquiring request; receive a push command of a multimedia file from the device control apparatus; transmit the push command to the device processing apparatus; receive a control command from the device control apparatus; and transmit the control command to the device processing apparatus. The device processing apparatus is configured to: acquire multimedia data from the multimedia server in response to receiving the push command; and complete an operation specified by the control command in response to receiving the control command. In some embodiments, the device control system may further comprise the multimedia server, other servers, other clients, and/or other smart devices as described above.

Figure 7:
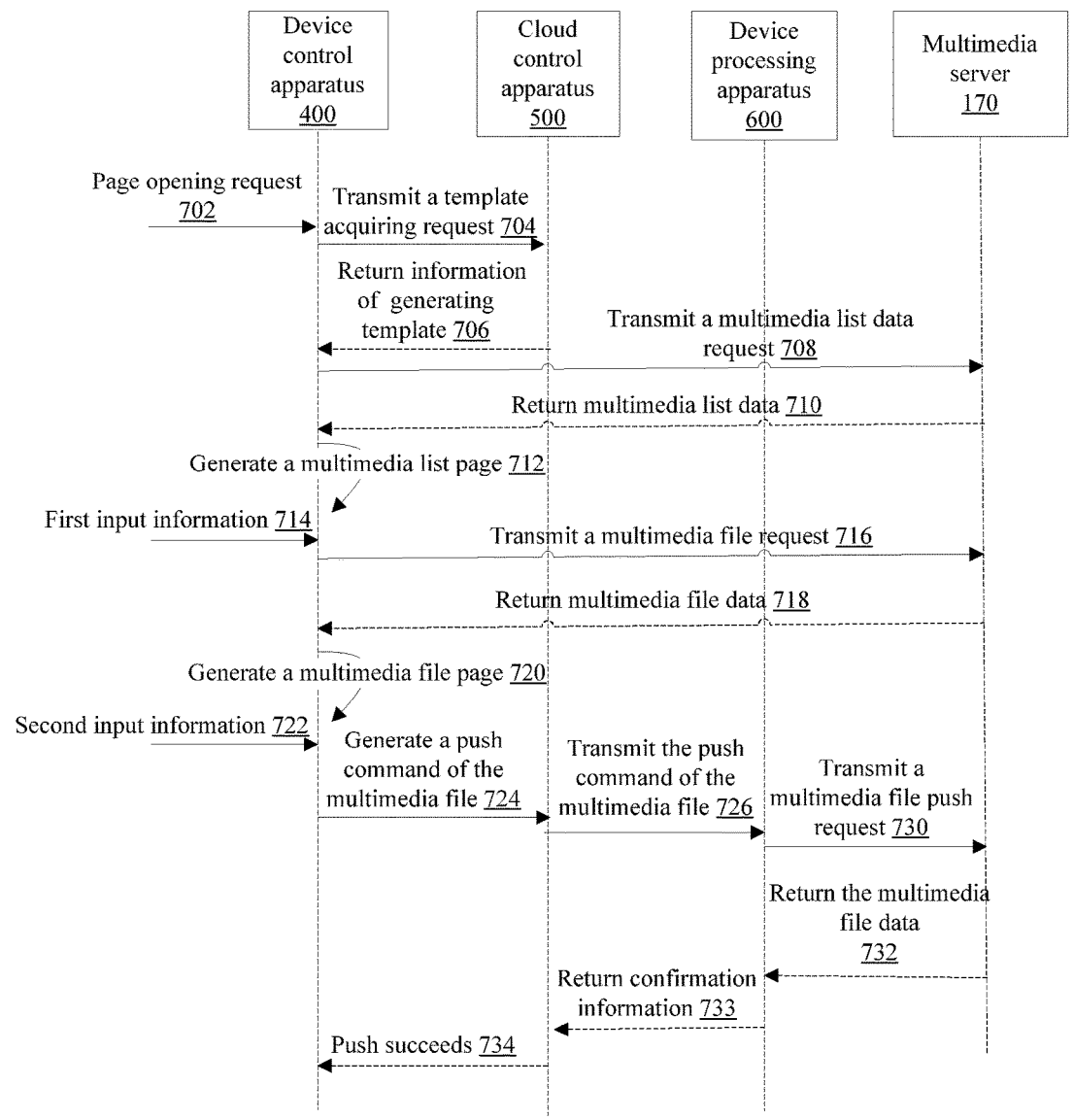
FIG. 7 is a method for pushing a multimedia file provided by an embodiment of the present disclosure.

As shown in FIG. 7, an embodiment of the present disclosure provides an on-demand and pushing method of a multimedia file. Firstly, a user opens the device control apparatus 400. For example, the user clicks on a program icon of the device control apparatus to open the program, and a display 108 of a client 101 thus displays a detail page of a device 180. According to the user's operation, the device control apparatus 400 receives a page opening request from the user (step 702). For example, the user may click on a menu "multimedia list" on a detail page, and then the device control apparatus 400 receives a multimedia list page request from the user. The device control apparatus 400 transmits a template acquiring request to the cloud control apparatus 500 according to the multimedia list page request (step 704). In response to the template acquiring request, the cloud control apparatus 500 returns information of the generating template to the device control apparatus 400 (step 706). The generating template may be an html5 page template.

Next, the device control apparatus 400 transmits the multimedia list data request to the multimedia server 170 (step 708). In response to the multimedia list data request, the multimedia server 170 returns multimedia list data to the device control apparatus 400 (step 710). The device control apparatus 400 generates a multimedia list page according to the received template information and the multimedia list data (step 712), and displays the multimedia list page to the user. The user selects a multimedia file according to the displayed multimedia list page; and the device control apparatus 400 thus receives first input information from the user (step 714). For example, the user selects a certain multimedia file from the list page to play, and the first input information indicates a user-selected multimedia file. According to the first input information, the device control apparatus 400 generates a multimedia file request, and transmits the multimedia file request to the multimedia server 180 (step 716). In response to the multimedia file request, the multimedia server 180 returns the multimedia file data to the device control apparatus 400 (step 718). The device control apparatus 400 generates the multimedia file page according to the generating template and the multimedia file data, and displays the multimedia file page on the display 108 (step 720). For example, the multimedia file page includes detailed information about the multimedia file, such as a file name, a size, duration, content introduction, poster or other picture, actor introduction, and so on.

The user may select to push the multimedia file to the device 180 (e.g., the user clicks to play the multimedia file) according to the displayed multimedia file page; and the device control apparatus 400 thus receives second input information from the user (step 722). According to the second input information, the device control apparatus 400 generates a push command, and transmits the push command to the cloud control apparatus 500 (step 724). The cloud control apparatus 400 transmits the push command to the device processing apparatus 600 through a persistent link (step 726). In response to the push command, the device processing apparatus 600 transmits a multimedia file push request to the multimedia server 170 (step 730). In response to the multimedia file push request, the multimedia server 170 transmits the requested multimedia file data to the device processing apparatus 600, resulting in pushing the multimedia file on the device 180 (step 732). For example, the push command may be a play command, and the device 180 acquires the multimedia file data directly from the multimedia server 170 and plays the multimedia file. The push command may also be another command, which is not limited in the present disclosure here. After the multimedia file is pushed on the device 180, the device processing apparatus 600 returns confirmation information to the cloud control apparatus 500 (step 733). The cloud control apparatus 500 may also return the confirmation information of successful push to the device control apparatus 400 (step 734). For example, the multimedia file includes: a video file and an audio file. For example, the multimedia file push command may include address information of the multimedia file (e.g., a uniform resource locator URL of the multimedia file).

In some embodiments, before executing the step 702, the multimedia server 170 may transmit extended information to the device processing apparatus 600, resulting in that the device processing apparatus 600 uploads the extended information to the cloud control apparatus 500. The extended information may include authentication information for accessing the multimedia server 170 (e.g., a token or other authentication information for accessing an application programming interface (api) of the server 170). The extended information may be stored on the smart server 150. The smart server 150 may also transmit the extended information to the client 101, for generating the multimedia list data request and the multimedia file request. Thus, the client 101 (or the device control apparatus 400) may acquire relevant data from the multimedia server 170 by using the multimedia list data request and the multimedia file request that include the extended information. In addition, the multimedia server 170 may provide an application programming interface to the device 180, the smart server 150, and the client 101, where the application programming interface is used for acquiring the multimedia list data and the multimedia file data from the multimedia server 170.

In some embodiments, the device control apparatus 400 provides a respective device details page for each device (e.g., each smart device having connection established with the smart server), and the device details page is used for displaying a current state of the device and interface information related to controlling the device. The multimedia server 170 provides a video-play type device 180 (e.g., a smart television) with a video content list that the video-play type device 180 can play. The device details page is developed according to an html5 language. For example, the multimedia list page (e.g., the video list), the multimedia file page (e.g., video details), and the device control page may all be implemented by the html5. For another example, the multimedia list data (for example, a television list) or the multimedia file data (for example, television details) transmitted by the multimedia server 170 to the device control apparatus 400 may be rendered on the device details page by the html5 for displaying, where the device processing apparatus 500, as a communication bridge, implements interaction between an html5 terminal and the device 180.

In some embodiments, a TV cloud technology is used in the multimedia server 170, a smart cloud technology is used in the smart server 150, the device control apparatus 400 is an application program installed on a memory of the smart client (e.g., a mobile phone), and the device 180 is a smart television terminal having a video playing function. For example, the user issues an upward instruction on the smart client, the device processing apparatus 600 of the smart television terminal receives the upward instruction, the device processing apparatus 600 on the smart television terminal transmits the upward instruction to the smart television terminal, and the smart television terminal performs a corresponding operation. The smart client acquires the generating template through the smart cloud (or the smart server) and acquires TV program list information through the TV cloud (or the multimedia server), and generates a TV program list page (a TV list UI) for the smart client's user to click on the TV program. Therefore, the user no longer needs to select video play program on the smart television terminal through a remote controller of the television, but may directly perform video-program-on-demand through the smart client. Then, the smart client acquires information about a certain TV program through the TV cloud (or the multimedia server) and displays details information of the TV program to the smart client's user, and the user again clicks on the media file, which results in that content of the TV program is pushed to the smart television. For example, the smart client transmits address information (e.g., TV URL) of the TV program to the smart cloud (or the smart server), and the smart cloud controls the smart television terminal to acquire data of the TV program directly from the TV cloud (or the multimedia server). The TV cloud (or the multimedia server) directly returns the data of the TV program to the television terminal for playing. The smart television terminal returns confirmation information to the smart cloud (or the smart server), resulting in that the smart cloud returns the confirmation information to the smart client. Technical solutions of the present disclosure perform division on functions of the smart client and the smart device (for example, the smart television terminal), the smart client provides the program list for the user to view and receives the user's selection operation performed on a certain program, and the smart device receives the video content from the TV cloud (or the multimedia server) according to the selection operation of the user performed on the smart client, and plays the video content.

It should be noted that, embodiments of the present disclosure may be used not only for controlling multimedia playing devices such as a smart television, but also for controlling other smart devices, which will not be limited in the present disclosure here.

What are described above is related to the illustrative embodiments of the disclosure only and not limitative to the scope of the disclosure; any changes or replacements easily for those technical personnel who are familiar with this technology in the field to envisage in the scopes of the disclosure, should be in the scope of protection of the present disclosure. Therefore, the scopes of the disclosure are defined by the accompanying claims.

The present application claims the priority of the Chinese Patent Application No. 201610302694.3 filed on May 9, 2016, which is incorporated herein by reference in its entirety as part of the disclosure of the present application.

The invention claimed is:

1. A device control method, comprising:
receiving a page opening request, the page opening request indicating opening a content page of a device;
acquiring a generating template of the content page according to the page opening request;
acquiring content data of the content page;
generating the content page according to the generating template and the content data; and
providing the content page;
wherein the content page includes a multimedia list page, and the content data includes multimedia list data;
the acquiring content data of the content page includes:
generating a multimedia list request;
transmitting the multimedia list request to the multimedia server; and
receiving the multimedia list data from the multimedia server;
the generating the content page according to the generating template and the content data includes: generating the multimedia list page according to the generating template and the multimedia list data; and
the providing the content page includes: displaying the multimedia list page.

2. The device control method according to claim 1, wherein the acquiring a generating template of the content page includes:
transmitting a template acquiring request; and
receiving information of the generating template.

3. The device control method according to claim 1, further comprising:
receiving first input information, the first input information indicating a selected multimedia file.

4. The device control method according to claim 1, wherein the content page further includes a multimedia file page, and the content data further includes multimedia file data;
the acquiring content data of the content page further includes:
generating a multimedia file request;
transmitting the multimedia file request to the multimedia server; and
receiving the multimedia file data from the multimedia server;
the generating the content page according to the generating template and the content data further includes: generating the multimedia file page according to the generating template and the multimedia file data;
the providing the content page further includes: displaying the multimedia file page.

5. The device control method according to claim 4, further comprising:
receiving second input information, the second input information indicating pushing the multimedia file;
generating a push command of the multimedia file according to the second input information; and
transmitting the push command of the multimedia file to a smart server.

6. The device control method according to claim 1, wherein the content page includes a device control page, and the content data includes device control data;
the acquiring content data of the content page includes:
generating a device control request;
transmitting the device control request to a smart server; and
receiving the device control data from the smart server, wherein the device control data includes a current state of the device and control instruction data of the device;
the generating the content page according to the generating template and the content data includes: generating the device control page according to the generating template and the device control data;
the providing the content page includes: displaying the device control page.

7. The device control method according to claim 6, further comprising:
receiving third input information, the third input information indicating control information of the device;
generating a control command of the device according to the third input information;
transmitting the control command of the device to the smart server.

8. A cloud control method, comprising:
receiving a template acquiring request from a client;
transmitting information of a generating template to the client according to the template acquiring request, wherein the information of the generating template is used for generating at least one of a multimedia list page and a multimedia file page;
receiving a push command of a multimedia file from the client, the multimedia file being included in at least one of the multimedia list page and the multimedia file page; and
transmitting the push command to a device controlled by the client.

9. The cloud control method according to claim 8, further comprising:
receiving a control command of the device from the client; and
transmitting the control command to the device.

10. The cloud control method according to claim 8, further comprising:
receiving extended information of a multimedia server from the multimedia server; and
transmitting the extended information to the device.

11. A device control apparatus, comprising:
an input module, configured to receive a page opening request, wherein the page opening request indicates opening a content page of a device;
a template generating module, configured to acquire a generating template of the content page according to the page opening request;

a content page generating module, configured to:
  acquire content data of the content page; and
  generate the content page according to the generating template and the content data; and
a providing module, configured to provide the content page;
wherein the content page includes a multimedia list page, and the content data includes multimedia list data;
the content page generating module, is configured to:
  generate a multimedia list request;
  transmit the multimedia list request to a multimedia server;
  receive the multimedia list data from the multimedia server; and
  generate the multimedia list page according to the generating template and the multimedia list data; and
the providing module is configured to: display the multimedia list page.

12. The device control apparatus according to claim 11, wherein the template generating module is configured to:
  transmit a template acquiring request; and
  receive information of the generating template.

13. The device control apparatus according to claim 11, wherein:
  the input module is further configured to receive first input information, the first input information indicating a selected multimedia file.

14. The device control apparatus according to claim 11, wherein the content page further includes a multimedia file page, and the content data further includes multimedia file data;
  the content generating module is further configured to:
    generate a multimedia file request;
    transmit the multimedia file request to a multimedia server;
    receive the multimedia file data from the multimedia server; and
    generate the multimedia file page according to the generating template and the multimedia file data; and
  the providing module is configured to: display the multimedia file page.

15. The device control apparatus according to claim 14, wherein:
  the input module is further configured to: receive second input information, the second input information indicating pushing the multimedia file; and
  the device control apparatus further comprises a command module, the command module being configured to:
    generate a push command of the multimedia file according to the second input information; and
    transmit the push command of the multimedia file to a smart server.

16. The device control apparatus according to claim 11, wherein the content page is a device control page, and the content data is device control data;
  the content generating module is configured to:
    generate a device control request;
    transmit the device control request to a smart server;
    receive the device control data from the smart server, wherein the device control data includes a current state of the device and control instruction data of the device; and
    generate the device control page according to the generating template and the device control data; and
  the providing module is configured to: display the device control page.

17. The device control apparatus according to claim 16, wherein:
  the input module is further configured to: receive third input information, the third input information indicating control information of the device;
  the device control apparatus further comprises a command module, the command module being configured to:
    generate a control command of the device according to the third input information; and
    transmit the control command of the device to the smart server.

18. A device control system, comprising:
  the device control apparatus according to claim 11;
  a device processing apparatus; and
  a cloud control apparatus;
  wherein the cloud control apparatus is configured to:
    receive a template acquiring request from the device control apparatus;
    transmit information of the generating template to the device control apparatus according to the template acquiring request;
    receive a push command of a multimedia file from the device control apparatus;
    transmit the push command to the device processing apparatus;
    receive a control command from the device control apparatus; and
    transmit the control command to the device processing apparatus; and
  wherein the device processing apparatus is configured to:
    acquire multimedia data from the multimedia server in response to receiving the push command; and
    complete an operation specified by the control command in response to receiving the control command.

* * * * *